No. 769,121. PATENTED AUG. 30, 1904.
G. B. WALKER.
WELDING MACHINE.
APPLICATION FILED JUNE 28, 1904.
NO MODEL. 2 SHEETS—SHEET 1.

Witnesses
J. Mason Mayhew
B. C. Rust

Inventor
George B. Walker,
by David Moore,
Attorney

No. 769,121. PATENTED AUG. 30, 1904.
G. B. WALKER.
WELDING MACHINE.
APPLICATION FILED JUNE 28, 1904.
NO MODEL. 2 SHEETS—SHEET 2.
Fig.4.
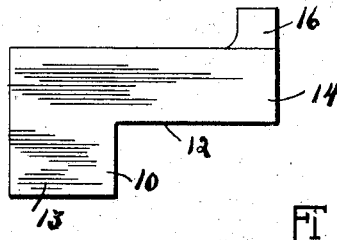
Fig.5. Fig.6.
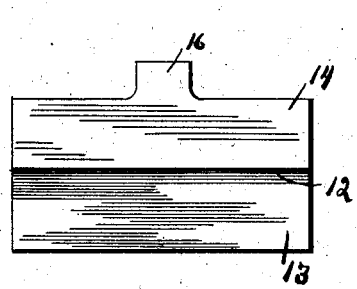 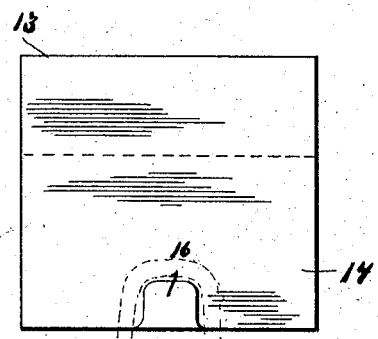
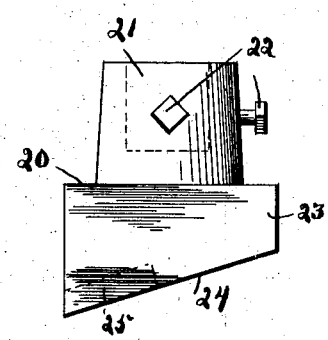 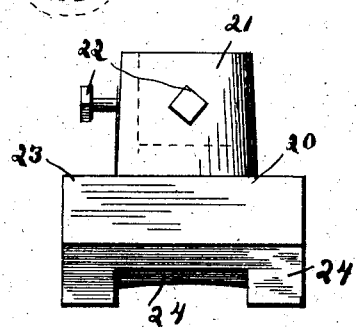
Fig.8.
Fig.7. 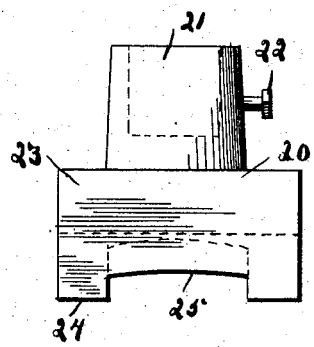 Fig.9.
Witnesses
J. Mason Hampus
B. C. Rust
Inventor
George B. Walker
by David C. Moore,
Attorney No. 769,121.

Patented August 30, 1904.

UNITED STATES PATENT OFFICE.

GEORGE B. WALKER, OF LEMOYNE, PENNSYLVANIA, ASSIGNOR OF THREE-FOURTHS TO JACOB E. HERTZLER, OF MECHANICSBURG, PENNSYLVANIA, ROBERT L. MYERS, OF CAMPHILL, PENNSYLVANIA, AND WILLIAM J. LESCURE, OF HARRISBURG, PENNSYLVANIA.

WELDING-MACHINE.

SPECIFICATION forming part of Letters Patent No. 769,121, dated August 30, 1904.

Application filed June 28, 1904. Serial No. 214,521. (No model.)

*To all whom it may concern:*

Be it known that I, GEORGE B. WALKER, a citizen of the United States, residing at Lemoyne, in the county of Cumberland and State of Pennsylvania, have invented certain new and useful Improvements in Welding-Machines, of which the following is a specification.

My present invention relates to improvements in welding-machines, and has special reference to that class of machines designed for welding chains, rings, or the like, in which I preferably employ a pneumatically-operated welding device or mechanism.

The main object of my invention is the provision of a simple mechanism for welding links of chains, in which I provide an adjustable means for adjusting the hammer mechanism, a removable anvil or lower portion of the chain-die, and a peculiar construction of hammer or upper die carried by the pneumatic hammer, whereby a wedging action is obtained when welding the link, so that the same is welded or molded into the proper shape without being flattened, the wedging action being carried out in the shortest possible time by the mechanism herein set forth.

To attain these objects, the invention consists of a welding-machine substantially as disclosed herein.

Figure 1:
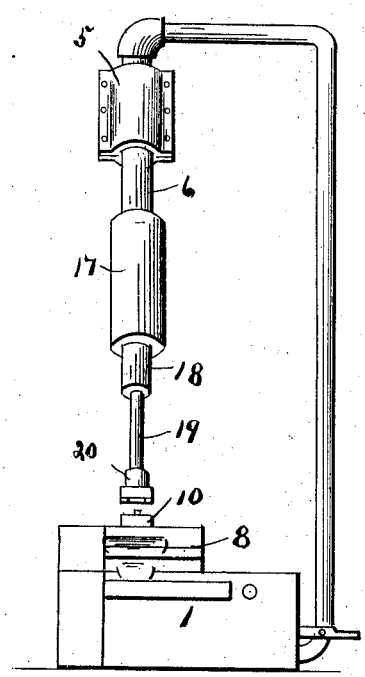
Figure 2:
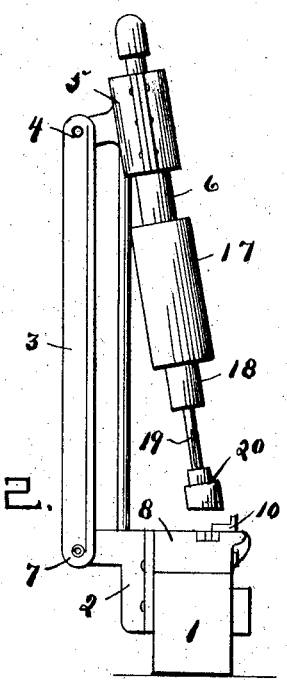
Figure 3:
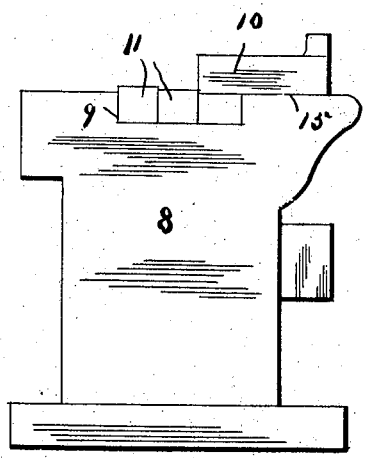

In the accompanying drawings, Figure 1 is a front elevation of the complete machine. Fig. 2 is a side elevation thereof. Fig. 3 is an enlarged side elevation of the machine with the pneumatic welding mechanism removed. Figs. 4, 5, and 6 are detail views of the lower die or anvil, and Figs. 7, 8, 9 are detail views of the upper die or hammer.

Referring to the drawings, the numeral 1 designates the base, which has formed upon the rear side thereof the bracket 2 for supporting the frame or arm 3, which arm is slotted or bifurcated in its upper end 4 for the reception of the tool-carrying frame 5, which is pivotally secured in said bifurcated end, so as to give the pneumatic tool 6 any desired adjustment or incline. This arm is also pivoted to the bracket 2 at 7, so that a double adjustment may be obtained. This, however, can be dispensed with, as I have found in practice that the one adjustment whereby the frame 5 is connected to the arm 3 is the only one that is absolutely necessary. The base 1 is provided with the raised portion 8, which is provided with a longitudinal channel or recess 9 for the reception of the lower wedging or die member 10, which is locked in said recess by means of the two locking-keys 11. This lower die member is provided with the rectangular recess 12, so that its rib or projection 13 will fit within the channel 9, while the projecting portion 14 will rest upon the surface 15 of the enlarged portion of the base, the upper face of the die being provided with the peculiar shaped die or projections 16, which is adapted to be surrounded by the link of the chain or ring when being welded.

The pneumatic tool, which is mounted in the frame 5, consists of the cylinder 17, piston 18, and the die-shank 19, which has removably carried upon its end the upper die or hammer 20. This die or hammer 20 consists of the socketed portion 21, which is provided with the two set-screws 22 for rigidly securing the die upon the shank of the pneumatic tool, and is further provided with the rectangular head 23, whose under surface is cut on an incline, as at 24, with the welding-recess 25 in its front edge and in alinement with the die or projection 16 of the lower member. By forming the lower face of the upper die inclined or beveled, as at 24, a wedging action is given as the hammer descends upon the lower die to wedge the link and secure the lap-joint thereof.

By means of the adjustment between the upper end of the arm 3 and the frame 5 the proper incline is given to the pneumatic tool, so that as the two dies come together a sliding action is given, which properly welds the lap-joint of the chain against the projection 16 without flattening the same, the recess 25 in the under face of the die 20 being so constructed that when the chain is completely welded no further action upon the chain is given, so that the same cannot be beaten in any other shape than the desired one.

By this construction any form or shape of die can be used and any striking action can take place or any inclined action, as may be desired. I would also have it understood that any mechanism for operating the upper die can be employed without departing from the spirit of my invention.

From the foregoing description, taken in connection with the drawings, it is evident that I provide a machine which thoroughly and rapidly welds the chain or ring, or, in fact, by changing the construction of the die this construction can be used for welding any form of metal, but, however, is especially adapted for welding chains.

What I claim as new, and desire to secure by Letters Patent, is—

In a welding-machine, the combination of an anvil with a die for holding and shaping the interior surface of the welded end of a link, means for locking the die to said anvil, an arm pivoted to the anvil, a tool-support pivoted to the upper end of said arm, a reciprocable tool carried by said support, and a reciprocable die carried by said tool provided with a lower inclined surface having a cavity in the forward portion of its face and constructed and designed to contact the upper face of the stationary die in its downward movement and to then slide or glance toward the forward portion of the stationary die to weld the link and form the exterior surface of the welded end of the link.

In testimony whereof I affix my signature in presence of two witnesses.

GEORGE B. WALKER.

Witnesses:
 DANIEL DRAWBAUGH,
 DAVID P. MOORE.